United States Patent [19]

Wolf

[11] 4,156,261
[45] May 22, 1979

[54] SCANNING DEVICE FOR A MAGNETIC TAPE INSTRUMENT

[75] Inventor: Theo Wolf, Rossdorf, Fed. Rep. of Germany

[73] Assignee: Robert Bosch Fernsehanlagen GmbH, Darmstadt, Fed. Rep. of Germany

[21] Appl. No.: 774,895

[22] Filed: Mar. 7, 1977

[30] Foreign Application Priority Data

Mar. 6, 1976 [DE] Fed. Rep. of Germany ....... 2609335

[51] Int. Cl.² .......................... G11B 21/24; G11B 5/56
[52] U.S. Cl. ...................................... 360/109; 360/84; 360/130.3
[58] Field of Search .................. 360/84, 109, 107–108, 360/130

[56] References Cited

U.S. PATENT DOCUMENTS

| 3,075,049 | 1/1963 | Gordon et al. | 360/84 |
| 3,218,648 | 11/1965 | Casey | 360/109 |
| 3,414,683 | 12/1968 | Dolby | 360/107 X |
| 3,591,732 | 7/1971 | Prochnow | 360/107 |
| 3,666,894 | 5/1972 | Prochnow | 360/84 |
| 3,787,644 | 1/1974 | Schneider | 360/109 |
| 3,995,317 | 11/1976 | Schmidt | 360/109 |
| 4,080,639 | 3/1978 | Gunschmann | 360/107 |

FOREIGN PATENT DOCUMENTS

| 2312085 | 5/1976 | France | 360/109 |
| 2312086 | 5/1976 | France | 360/109 |

*Primary Examiner*—John H. Wolff
*Attorney, Agent, or Firm*—Ernest F. Marmorek

[57] ABSTRACT

A scanning device, for use in a magnetic instrument of the type using diagonal track scanning, features a two-part stationary guide drum having a central axis, a head assembly rotatably supported inside the guide drum including a head wheel, a bearing near the head wheel, and a motor operable to drive the head wheel about an axis of rotation, and bearing adjusting means operable to radially move the bearing to align substantially the axis of rotation and the central axis and comprising at least three radially spaced apart adjusting elements, at least one of which is resiliently urged towards the axis of rotation.

5 Claims, 1 Drawing Figure

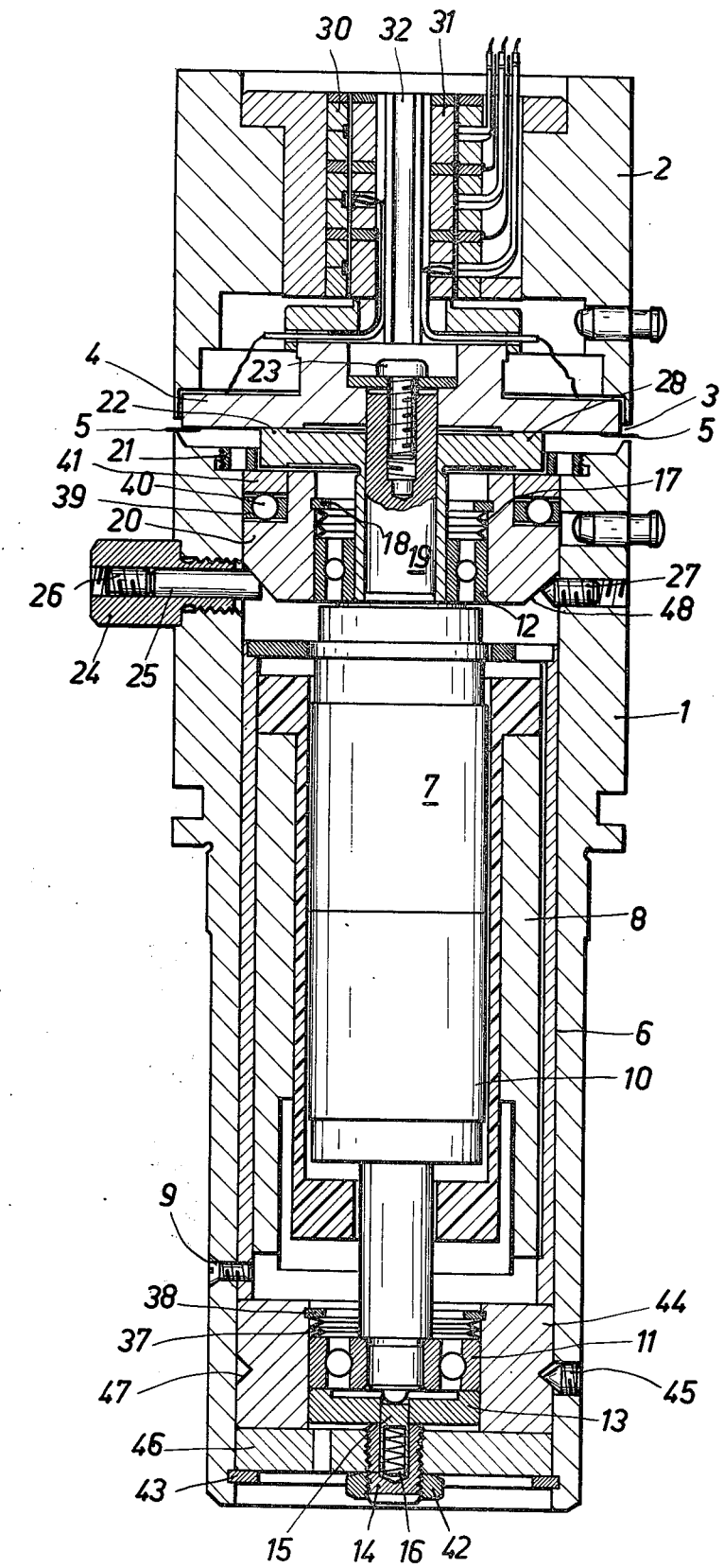

SCANNING DEVICE FOR A MAGNETIC TAPE INSTRUMENT

CROSS REFERENCE TO RELATED APPLICATIONS

Reference is had to the following co-pending patent applications:

Rudolf Prochnow et al., application Ser. No. 616,808, filed Sept. 25, 1976 and now abandoned; Rudolf Prochnow, application Ser. No. 669,346, filed Mar. 22, 1976 now U.S. Pat. No. 4,032,986, issued June 18, 1977; Peter Gunschmann, application Ser. No. 604,626, filed Aug. 14, 1975 now U.S. Pat. No. 3,990,110, issued Nov. 2, 1976; and Peter Gunschmann, application Ser. No. 685,381, filed May 11, 1976 now U.S. Pat. No. 4,080,639, issued Mar. 21, 1978. All of the foregoing patent applications are assigned to the same assignee as the instant application.

In addition, reference is had to the Rudolf Prochnow U.S. Pat. No. 3,666,894 of Rudolf Prochnow and assigned to the predecessor of the instant assignee.

BACKGROUND OF THE INVENTION

The invention relates to a scanning device, for use in a magnetic instrument of the type using diagonal track scanning. In particular, reference is had to the aforementioned Peter Gunschmann application Ser. No. 685,381.

Generally, a high relative velocity is required between an electromagnetic transducer or magnetic tape head, and the magnetic tape is needed for wide band magnetic signals recorded on the magnetic tape. Typically, scanning systems have been developed wherein the magnetic heads are arranged on the periphery of a rapidly rotating head wheel and scan relatively slow moving magnetic tape at an angle with respect to the centerline of the magnetic tape. The stored information is recorded on the magnetic tape in a series of parallel track segments closely spaced apart from one another.

The high rate of speed at which the magnetic heads move across the magnetic tape require close contact between the magnetic heads and the magnetic tape in order to optimize signal transfer.

It has been found that the combination of the pressure exerted by the magnetic heads on the magnetic tape and the high speed at which the head wheel moves the magnetic heads over the magnetic tape results in a deterioration of the mechanical tolerances for proper operation. In practice, it is frequently necessary to change magnetic heads because the operation reduces the effectiveness.

Changing magnetic heads will not normally result in a properly aligned scanning device because of the high degree of accuracy required for positioning the magnetic heads with respect to the head disc. Normally, the head disc must be replaced and the magnetic heads readjusted.

In order to achieve proper relative adjustment between the magnetic heads and the head disc, the head wheel must be detached from the driving motor shaft and then reconnected after alignment. Because of the high precision required for proper alignment, these operations are carried out at the manufacturer's plant. Of course, this results in a loss of time and considerable costs. Furthermore, the head wheel is usually connected to the motor shaft of the driving motor so that is necessary to dismantle the entire scanning device to exchange magnetic heads.

SUMMARY OF THE INVENTION

One of the principal objects of the invention is a construction of a scanning device having a head wheel mounting which makes possible for an easy, quick, and relatively precise change of the head wheel.

Another object of the instant invention is a scanning device, for use in a magnetic instrument of the type using diagonal track scanning, including a two-part stationary guide drum having a central axis, a head assembly rotatably supported inside the guide drum and including a head wheel, a bearing near the head wheel, and a motor operable to drive the head wheel about an axis of rotation, and bearing adjusting means operable to radially move the bearing to align substantially the axis of rotation and the central axis, a comprising at least three radially spaced apart adjusting elements, at least one of which is resiliently urged towards the axis of rotation.

Generally, the prior art scanning devices are not capable of allowing adjustment tolerances in order of 1 micron. Typically, a prior art scanning device includes an adjustment in the axial direction by means of adjusting screws which press the jacket tightly against a stationary abutment so that the jacket can move in an ever shifting pattern of static and sliding friction. The change of the coefficient of friction, however, results in erratic movement and thereby complicates the precise adjustment.

A further disadvantage of the prior scanning device adjustment system is found in that there is an eccentric contact of the adjusting screws with the bevelled edge of the jacket so that the adjusting screws result in a force which tends to rotate the jacket. Because of the fabrication techniques, the bevelled edge of the jacket is not always well defined. For this reason, the rotation of the jacket is transferred to an adjusting screw which is fixed or a springloaded pin.

The instant invention endeavors to overcome the problems connected with friction and to allow the adjustment of the head wheel shaft with respect to the axis of rotation.

The invention accordingly comprises the features of construction, combination of elements and arrangement of parts which will be exemplified in a construction hereinafter set forth and the scope of the application of which will be indicated in the claims.

BRIEF DESCRIPTION OF THE DRAWING

For a full understanding of the nature and objects of the invention, reference should be had to the following detailed description, taken in connection with the accompanying drawing, in which:

The FIGURE is a sectional view of a scanning device according to the instant invention.

DESCRIPTION OF THE PREFERRED EMBODIMENT

In carrying the invention into effect, one embodiment has been selected for illustration in the accompanying drawings and for description in the specification, reference being had to the figure.

A two-part stationary guide drum includes a lower part 1 and an upper part 2. The parts 1 and 2 define a gap 3 within which a head wheel 4 can rotate. Magnetic heads 5 are mounted on the periphery of the head wheel 4.

A motor 7 for rotating the head wheel 4 is mounted in the lower part 1. A stationary portion 8 of the motor 7 is fitted into a bore hole 6 with a sliding engagement and is secured by three countersunk screws 9 which are angularly displaced by about 120 degrees with respect to each other. A rotor 10 of the motor 7 is mounted in two ball bearings 11 and 12. The lower bearing 11 can be vertically adjusted by a headless screw 14 bearing on washer 13 in order to adjust the circular path of the magnetic heads 5 on the head wheel 4.

A ground connection pin 15 and leaf-type spring 16 maintain the rotor 10 electrically grounded in order to prevent electrical noise being generated by an electrical path through the ball bearings 11 and 12.

The external rings of the ball bearings 11 and 12 are prestressed in a longitudinal direction by means of cup-spring units 37 and 17, which press against the outer rings of the bearings 11 and 12, and also press against retaining rings 38 and 18. The retaining ring 18 is retained in a bore hole in jacket 20. The jacket 20 is offset in a ring-shaped manner and forms the lower ring of an axial ball bearing which includes a cage 39, bearing balls 40, and an upper ring 41. The upper ring 41 bears against a threaded ring 21. The external diameter of the jacket 20 is somewhat smaller than the diameter of bore hole 6.

In order to achieve the faultless scanning of a magnetic tape moved over the periphery of the guide drum parts 1 and 2, it is essential that the axis of rotation of the head wheel 4 coincide substantially with the longitudinal axis of the guide drum parts 1 and 2. That is, the magnetic tape on the surface of the guide drum parts 1 and 2 must be substantially concentric with each of the magnetic heads 5.

In order to achieve this relationship, a take-up plate 28 is very accurately fitted into a shaft end 19 and its contact area 22 is accurately shaped. For this reason, the head wheel 4 which is centered on the shaft end 19 rotates in an exactly circular path without wobbling after the head wheel 4 is mounted and tightly secured by a central fastening screw 23.

A jacket 44 which takes up the external ring of the ball bearing 11 rests on a guard ring 43 through an intermediary hollow disc 46. The jacket 44 is maintained free from play by three headless screws having conical tips and being displaced by about 120 degrees with respect to each other. Being uniformly tightened, the screws 45 engage the flange of a V-shaped annular slot 47 in the jacket 44 and bring about the front-side application of the jacket 44 against the plane parallel disc 46 which in turn presses against the guard ring 43.

The concentric adjustment of the head wheel 4 with respect to the cylindrical peripheral area of the guide drum parts 1 and 2 is accomplished by the use of bearing adjusting means such as adjustment elements 27 and 24. Two adjusting elements 27 are in the form of headless screws with conical tips. The adjustment element 24 includes a longitudinal plunger element 25 having a slanted tip. The element 24 can be applied against the jacket 20 by means of a headless screw 26. The element 25 is resiliently urged towards the axis of rotation. The action of the adjustment elements 27 and 24 at the bevelled edge 48 of the jacket 20 assures the abutment against the threaded ring 21.

Above a head wheel 4, the signal transferring element is arranged comprising a stationary part 30 and a rotatable part 31 which rotates with the head wheel 4. The part 31 is connected to the head wheel 4 and defines a longitudinal bore hole 32 through which a screw 23 can be engaged. When the screw 23 is loosened, the head of it comes to lie against the lower shoulder of the part 31 and lifts it upwardly along with the head wheel 4 secured thereto. To remove the head wheel 4, the guide drum 2 is lifted upwardly after loosening a fastening screw. For purposes of adjustments, screws 27 are adjusted up to the point the centering error is symmetrical with respect to the element 24. The plunger element 25 is adjusted by means of the screw 26.

The smooth action of the axial ball bearing means 20, 39, 40, and 41 in conjunction with the absence of any peripheral component with respect to the jacket 20 during the adjustment of a screw 26 results in the smooth continuous centering without any erratic movement. No further adjustment of the element 27 is needed, and the precise adjustment is obtained efficiently and smoothly.

I wish it to be understood that I do not desire to be limited to the exact details of construction shown and described, while obvious modifications will occur to a person skilled in the art.

Having thus described the invention, what I claim as new and desired to be secured by Letters Patent is as follows:

1. A scanning device, for use in a magnetic instrument of the type using a longitudinal tape for diagonal track scanning, comprising, in combination:
   a two-part stationary guide drum having a central axis concentric with said drum parts;
   a head assembly supported inside said guide drum rotatably about an axis of rotation, and including a head wheel, bearing means rotatably supporting said head assembly, said bearing means including a bearing near said head wheel, and a motor operable to drive said head assembly about said axis of rotation, the tape being movable in the vicinity of said head wheel at a predetermined angle of inclination relative to said axis of rotation;
   bearing adjusting means operable to move said bearing radially to concentrically align said axis of rotation with said central axis, said bearing adjusting means comprising three radially spaced apart adjusting elements, at least one of which has means for resiliently urging it towards said axis of rotation,
   an annular element for axially retaining, said bearing near said head wheel; and
   axial thrust bearing means disposed between said bearing near said head wheel and said element to facilitate smooth centering of said bearing with respect to said guide drum by consecutively adjusting said bearing adjusting means.

2. The scanning device as claimed in claim 1, wherein said one of which adjusting elements includes a plunger-like element and a screw engaging said element for displacing it.

3. The scanning device as claimed in claim 1, wherein said bearing comprises a jacket and said bearing adjustment means engage said jacket for its operative alignment.

4. The scanning device as claimed in claim 3, wherein said jacket has a ring-shaped bevelled edge and said bearing adjusting means engage said bevelled edge.

5. The scanning device as claimed in claim 1, wherein said bearing adjusting means aligns said axes in a substantially tilt-free manner.

* * * * *